United States Patent [19]

Raidel

[11] Patent Number: 4,691,937
[45] Date of Patent: Sep. 8, 1987

[54] VEHICLE SUSPENSION ASSEMBLY

[76] Inventor: John E. Raidel, Rte. 1, Box 400-M, Springfield, Mo. 65804

[21] Appl. No.: 864,334

[22] Filed: May 19, 1986

[51] Int. Cl.[4] .............................................. B60G 11/26
[52] U.S. Cl. .................................... 280/711; 280/688
[58] Field of Search ............... 280/688, 713, 682, 687, 280/678, 711, 712

[56] References Cited

U.S. PATENT DOCUMENTS

| | | | |
|---|---|---|---|
| 4,033,608 | 7/1977 | Sweet et al. | 280/711 |
| 4,166,640 | 9/1979 | Van Denberg | 280/711 |
| 4,248,447 | 2/1981 | Hart | 280/688 |
| 4,293,145 | 10/1981 | Taylor | 280/711 |
| 4,310,171 | 1/1982 | Merkle | 280/688 |
| 4,379,572 | 4/1983 | Hedenberg | 280/711 |
| 4,427,213 | 1/1984 | Raidel, Jr. | 280/711 |
| 4,447,072 | 5/1984 | Bradley et al. | 280/688 |
| 4,518,171 | 5/1985 | Hedenberg | 280/711 |
| 4,529,224 | 7/1985 | Raidel | 280/711 |
| 4,541,653 | 9/1985 | Raidel | 280/711 |

Primary Examiner—Richard A. Bertsch
Attorney, Agent, or Firm—Rogers, Howell, Moore & Haferkamp

[57] ABSTRACT

A vehicle suspension system incorporating an air spring for installation on a vehicle that already has a leaf spring suspension system. The air spring suspension system is supported at an end of the leaf spring assembly and it has a spring seat connected to a shackle that is connected to an end of the leaf spring assembly. A transverse bolster rail allows the air spring assembly to have a wide base mount laterally outboard of the vehicle chassis and the leaf spring suspension. A cross radius rod prevents transverse movements of the axle. A sway bar connected between the left and right side air spring suspension assemblies rigidizes and stabilizes the suspension system.

19 Claims, 5 Drawing Figures

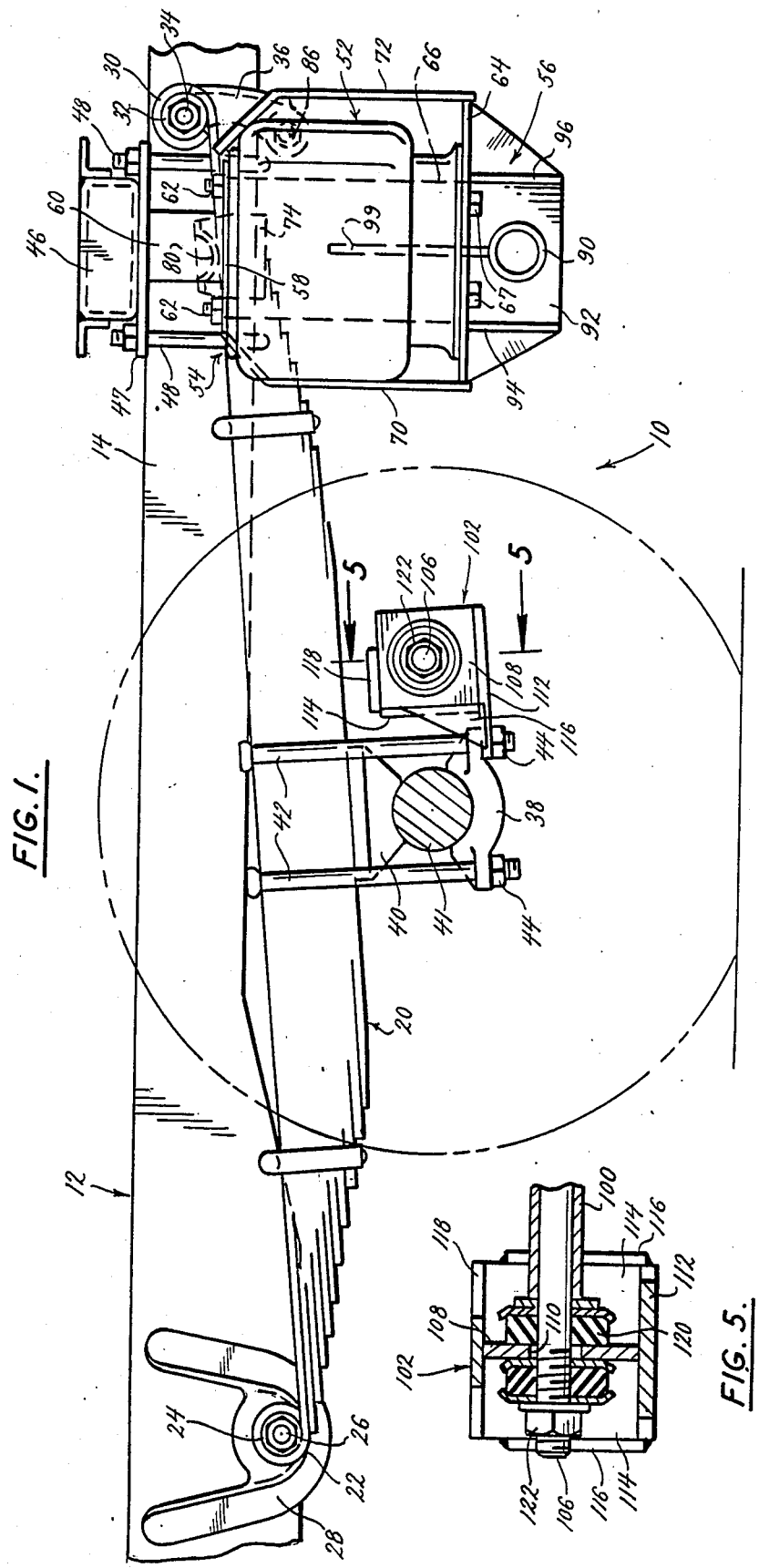

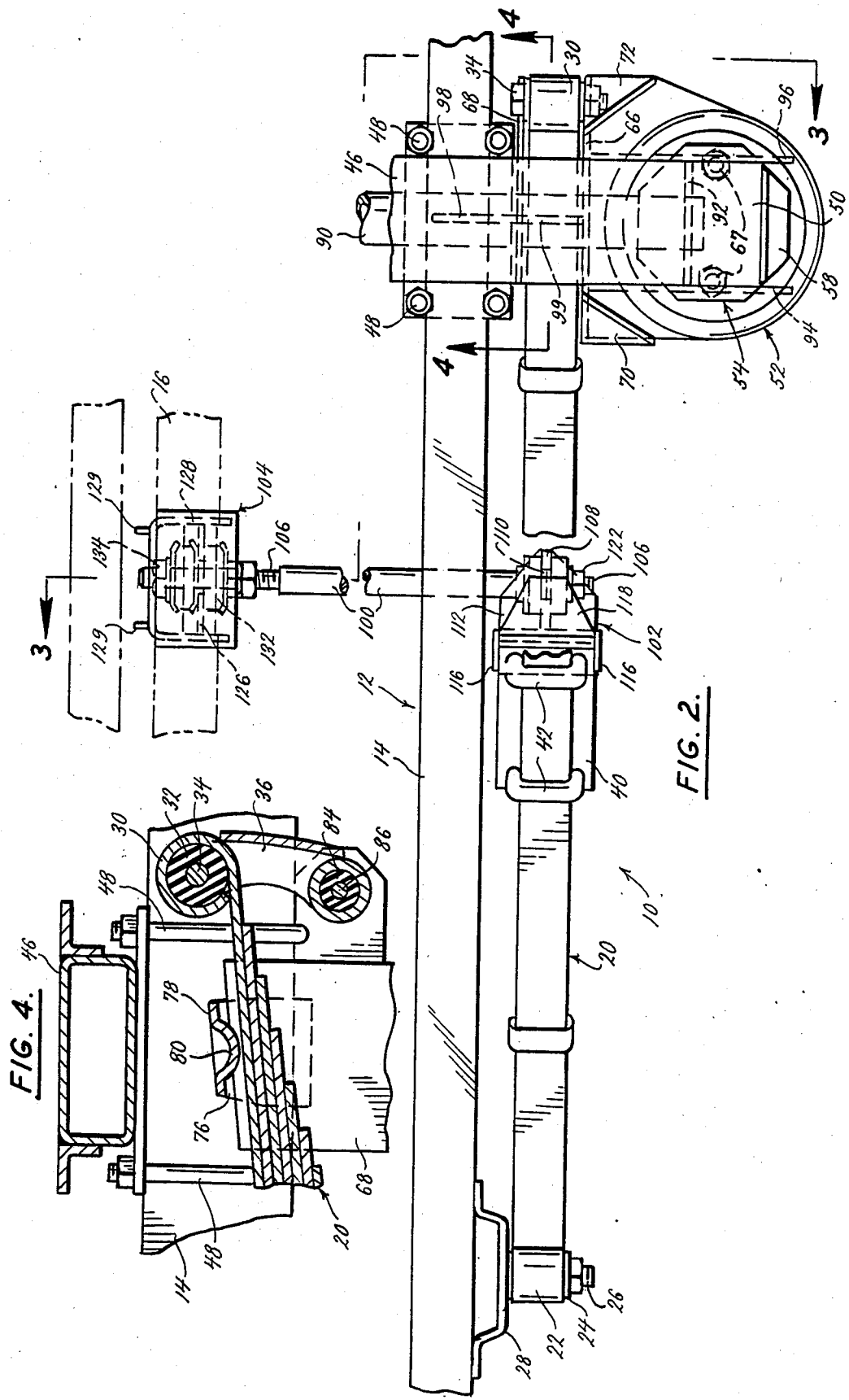

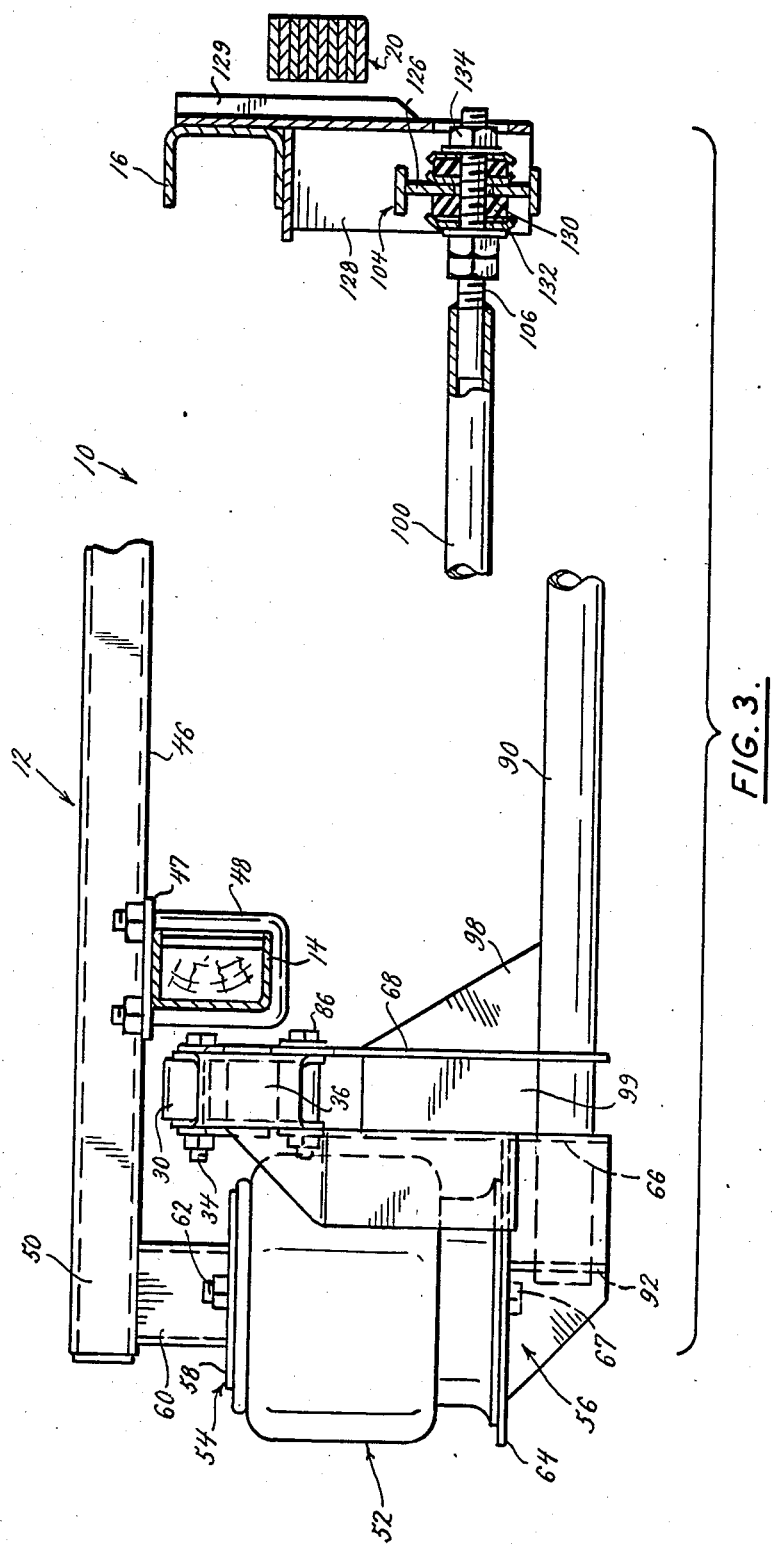

VEHICLE SUSPENSION ASSEMBLY

BACKGROUND OF THE INVENTION

This invention relates to a vehicle suspension assembly incorporating an air spring that provides an additional spring when combined with an existing leaf spring assembly. More particularly, the invention provides such a suspension assembly that can be used to modify an existing suspension by installation on a vehicle that already has a leaf spring suspension. Alternatively, this suspension assembly can be incorporated in original equipment installations.

There have been suspension systems that have a leaf spring assembly and an air spring. Examples are set forth in Raidel U.S. Pat. No. 3,434,707, 3,510,149 and 3,612,572. However, the prior art systems are not designed to take advantage of a complete leaf spring suspension capable of operation as an independent suspension that is combined with an air suspension.

SUMMARY OF THE INVENTION

This suspension assembly provides an air ride resulting from the incorporation of air springs and combines the air ride with an existing leaf spring suspension assembly. The existing leaf spring suspension assembly may be of the conventional kind having one end of a laminated group of leaf springs mounted to a bushing that is fastened to a hanger depending from the vehicle chassis. The vehicle axle is supported from the leaf spring group at a selected point between the ends and generally central of the leaf spring group. At the other end of the leaf spring group, there is a shackle. To accommodate the suspension assembly of the present invention, the shackle is disconnected from the vehicle chassis and is connected to a lower spring seat. The lower spring seat is further joined to the leaf spring group by a mounting bracket that also acts as a lateral guide for the leaf spring group as it allows them to slide as they flex. The upper spring seat is supported from the vehicle chassis so that the upper side of the air spring is fixed relative to the vehicle chassis.

To restrain the axle from lateral movement, in view of the disconnection of the shackle from the chassis, a bracket is connected to the axle seat and one end of a cross radius rod is mounted in a bushing in the bracket. The other end of the cross radius rod is mounted in a bushing that is connected to the chassis on the opposite side of the vehicle. The bushings allow oscillatory movement of the cross radius rod but does not permit transverse movement and therefore prevent transverse movements of the axle.

A sway bar is connected between the lower spring seats on opposite sides of the vehicle. The sway bar is welded to the lower spring seats to provide a unitized lateral stabilizer.

For added stability and riding comfort, the suspension systems of this invention incorporates a wide base mount. This is accomplished by providing a transverse bolster beam extending laterally outboard of the chassis to provide the upper air spring seat and by providing the lower spring seat with an outboard extending saddle to which the air spring is connected.

BRIEF DESCRIPTION OF THE DRAWINGS

FIG. 1 Is a side elevation view of the suspension assembly as installed on the left side of a vehicle;

FIG. 2 is a top plan view of the suspension assembly;

FIG. 3 is a view in section taken along the plane of the line 3—3 of FIG. 2;

FIG. 4 is an enlarged view in section taken along the plane of the line 4—4 of FIG. 2; and FIG. 5 is an enlarged view in section taken along the plane of the line 5—5 of FIG. 1.

DETAILED DESCRIPTION OF PREFERRED EMBODIMENT

This suspension assembly 10 is adapted for installation on a vehicle chassis 12 of the kind having a left chassis frame member 14 and a right chassis frame member 16. It will be understood that the suspension assembly 10 illustrated for the left side of the vehicle is duplicated with the same kind of suspension assembly on the right side of the vehicle. Accordingly, only one suspension assembly 10 for the left side of the vehicle will be described.

The chassis 12 incorporates a leaf spring assembly 20 that has one end 22 wrapped about a bushing 24. The bushing 24 is held by a bolt 26 to a hanger 28 that is welded or otherwise secured to the side frame member 14. The other end 30 of the leaf spring assembly 20 is wrapped about another bushing 32. The bushing 32 is fastened by a bolt 34 to the upper end of a shackle 36. There is a lower axle seat 38 and an axle retainer 40 that are clamped about the vehicle axle 41 and are fastened to the leaf spring assembly by a pair of U-bolts 42. The U-bolts 42 are tightened in place by nuts 44.

This suspension assembly 10 incorporates a wide base mount and some vehicle chasses may be able to accommodate the wide base mount. However, typically for this invention, a transversely extending bolster rail 46 is provided. The bolster rail 46 has a plate 47 welded to it to allow it to be connected to the chassis frame member 14 by U-bolts 48 wrapped about the chassis frame member 14 as shown in FIGS. 1 and 3. The end 50 of the bolster beam 46 projects laterally beyond the chassis frame member 14 by a distance sufficient to contribute to the wide base suspension assembly mount as will become apparent.

The suspension assembly 10 incorporates an air spring 52 mounted between an upper spring seat 54 and a lower spring seat 56. The upper spring seat 54 comprises a plate 58 welded to a vertical beam member 60 that is joined to and extends downwardly from the end 50 of the bolster beam 46. Suitable bolts 62 connect the upper side of the air spring 52 to the plate 58 of the upper spring seat 54.

The lower spring seat 56 comprises a horizontal plate 64 that extends laterally outwardly from a vertical plate 66 that lies on one side of the shackle 36. The plate 64 thus acts as a saddle to which the lower side of the air spring is connected, as by bolts 67. Another plate 68 is parallel to the plate 66 and lies on the other side of the shackle 36. There are suitable reinforcing gusset plates 70 and 72 connected between the lower spring seat plate 64 and the vertical plate 66, bent as necessary to add reinforcing strength and to conform to the shape of the vertical plates 66 and 68.

Secured to and extending upwardly from the two vertical plates 66 and 68 on opposite sides of the leaf spring assembly 20 are a pair of flat arms 74 and 76. A cross member 78 extends between the arms 74 and 76 and is positioned above the leaf spring assembly 20. An arcuate wear pad 80 extends downwardly from the cross member 78 and is in contact with the upper surface of the leaf spring assembly 20. The plates 74 and 76, together with the wear pad 80, cooperate to act as a lateral spring guide while allowing the leaf spring assembly 20 to slide as it flexes. The plates 74 and 76 with the wear pad 80 also secure the lower spring seat 56 to the leaf spring assembly 20.

Another connection between the leaf spring assembly 20 and the lower spring seat 50 is through the shackle 36. For this, the lower end of the shackle 36 is mounted on a bushing 84. The bushing 84 is mounted on a suitable bolt 86 that extends between the vertical plates 66 and 68.

A sway bar 90 is connected between the lower spring seat 56 of the suspension assembly 10 and the corresponding lower spring seat of the suspension assembly that is on the opposite side of the vehicle. The sway bar 90 extends through the vertical plates 66 and 68 and is welded thereto, and extends therebeyond to a position below the horizontal plate 64 of the lower spring seat 56. A plate 92 is welded to the horizontal plate 64 and the sway bar 90 extends through and is welded to the plate 92. There are reinforcing gusset plates 94 and 96 welded to the lower side of the horizontal spring seat plate 64 and the plate 92. Another gusset plate 98 is welded to the vertical plate 68 and to the top of the sway bar 90. A plate 99, aligned with the gusset plate 98, extends between and is welded to the vertical plates 66 and 68 as well as to the top of the sway bar 90.

A cross radius rod 100 extends between a mounting bracket 102 that is connected to the axle seat assembly 38 and a bracket 104 that is connected to the opposite side frame member 16. The cross radius rod 100 incorporates a threaded joint 106 to allow adjustment of its length.

The bracket 102 comprises a vertical plate 108 having a hole 110 through it. The plate 108 is mounted on another plate 112 that is connected by two of the nuts 44 to one of the axle-clamping U-bolts 42. There are reinforcing plates 114, 116 and 118 as shown to hold the plate 108 rigid relative to the axle 41. There is a grommet 120 extended through the hole 110 in the plate 108, and a nut 122 locks the cross radius rod 100 against the grommet 120. The grommet 120 allows allows oscillation of the cross radius rod 100 in any direction, but does not permit lateral movement.

On the other side of the vehicle, the bracket 104 includes a plate 126 welded to the sides of a channel member 128 that is welded to and extends downwardly from the chassis frame member 16. Stiffening ribs 129 are welded to the channel member 128. There is a hole 130 in the plate 126 and another grommet 132 extends through the hole 130. The cross radius rod 100 extends through the grommet 132 and is fastened in place by a nut 134. The grommet 132 also allows oscillation of the cross radius rod 100 in any direction but does not permit movement transverse to the vehicle. Thus, the cross radius rod 100 stabilizes the axle 41 in a direction transverse to the vehicle even though the shackle 36 is not connected to the chassis.

Operation and Assembly

Typically, the suspension assembly of the present invention would be installed on a vehicle that already has a leaf spring suspension. The existing leaf spring suspension would comprise the leaf spring lamination group 20 supported at one end 22 to the hanger 28, typically by a bushing such as the bushing 24. The vehicle axle 41 would be supported from the leaf spring assembly as shown on the drawings. A shackle 36 at the other end of the leaf spring assembly would be connected to the leaf spring assembly by way of a bushing 32. The other end of the shackle would be connected to the vehicle chassis.

To install the air spring suspension assembly of the present invention, it is usually necessary to add a transverse bolster rail, such as the bolster rail 46. Because the suspension assembly of the present invention is a wide base assembly, the bolster rail 46 should have ends 50 projecting laterally beyond and outboard of the existing leaf spring assemblies 20.

The bolster rail 46 supports the upper spring seat 54. The lower spring seat 56 is hung from the leaf spring assembly by a mounting bracket 74 and is also connected to the other end of the shackle 36. The bracket 74 has a wear pad 80 that allows the leaf spring assembly 20 to slide as it flexes while still supporting the lower spring seat 56. The bracket 74 also acts as a lateral spring guide.

The cross radius rod 100 can be installed by first mounting the bracket 102 on the U-bolt 42 and installing the bracket 104 on the chassis side rail 16. The bushings 120 and 132 can be installed in place and the cross radius rod 100 installed. The threaded joint 106 allows the cross radius rod 100 to be adjusted to the correct length for proper installation.

After the two air suspension assemblies are installed, the sway bar 96 can be installed by welding it to the two lower spring seats 56. All of the gusset plates are welded in place for strengthening and rigidizing purposes.

The air ride suspension assembly of this invention cooperates with the leaf spring suspension assembly that was already on the vehicle. As vertical forces are applied to the axle, they are resisted by the leaf spring assembly. Because the shackle 36 is connected from the leaf spring assembly to the lower spring seat 56, the connection to the chassis is through the air spring 52. Therefore, the air spring suspension adds its dampening capacity to that of the leaf spring suspension. The cross radius rod 100 allows oscillating movements so that the axle 41 can tilt, but the cross radius rod 100 prevents transverse movements of the axle. The sway bar 90 provides lateral stabilization.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. In a vehicle having a chassis and an axle, a vehicle suspension system for instatllation between the chassis and the axle comprising, an elongated leaf spring assembly having first and second ends, means for connecting the leaf spring assembly to the axle at a point intermediate the first and second ends, means for supporting the first end of the leaf spring asembly from the chassis with the second end free to move vertically and longitudinally relative to the chassis, a first spring seat, means for joining the first spring seat to the second end of the leaf spring assembly, a second spring seat spaced vertically from the first spring seat, means, for connecting the second spring seat to the chassis, and air spring means connected between the first and second spring seats whereby in addition to functioning as a spring, the leaf spring assembly functions as a beam extending from the first end to the axle and to the air spring means.

2. The vehicle suspension system of claim 1 wherein the suspension system is installed on one side of the vehicle and a similar suspension system is installed on the other side of the vehicle and including a sway bar connected between the first spring seat and a corresponding first spring seat on the second-named suspension system.

3. The suspension system of claim 1 including a cross radius rod connected between the chassis and the axle connecting means.

4. The vehicle suspension system of claim 1 wherein the first spring seat is below the second spring seat.

5. The vehicle suspension system of claim 1 wherein the joining means includes a shackle having bushing connections to the second end of the leaf spring assembly and to the first spring seat.

6. A suspension system for installation between the chassis and axle of a vehicle comprising a leaf spring assembly having first and second ends, means to connect the axle to the leaf spring assembly intermediate the ends thereof, means for supporting the first end from the chassis with the second end free from any connection to the chassis, means defining an upper spring seat, means to suppport the uper spring seat from the chassis, a lower spring seat, means for supporting the lower spring seat from the leaf spring assembly, spring means connected between the upper and lower spring seats, and means to restrict lateral movement of the leaf spring asembly and the lower spring seat.

7. The suspension system of claim 6 wherein the last-named means comprises a sway bar connected between the lower spring seats of complementary suspension systems on opposite sides of the vehicle.

8. The suspension system of claim 7 wherein the lower spring seat incorporates vertical plates having holes through which the sway bar extends and to which the sway bar is welded.

9. The suspension system of claim 6 including a cross radius rod connected between points on the axle connecting means and on the chassis to restrict transverse movement of the axle.

10. The suspension system of claim 9 wherein the cross radius rod is connected to the axle and to the chassis through grommets to permit oscillation of the cross radius rod at the connection points.

11. A vehicle suspension system comprising two assemblies for installation on the left and right sides of a vehicle having a chassis with left and right sides, axle means adjacent the left and right sides of the chassis, first and second hangers depending from the respective sides of the classis, first and second leaf spring assemblies associated with the respective hangers, each leaf spring assembly having first and second ends, means connecting the axle means to the respective leaf spring assemblies, the first end of each leaf spring assembly being supported by its associated hanger and first and second shackles on the second ends of the respective leaf spring assemblies, each assembly of the vehicle suspension system comprising an air spring having upper and lower faces, an upper spring seat connected to the upper face, a lower spring seat connected to the lower face, means to support the upper spring seat against movement relative to the chassis, means to connect the lower spring seat to one of the shackles, and means to support the lower spring seat from one of the leaf spring assemblies while allowing sliding movement of the leaf spring assembly relative to the lower spring seat.

12. The vehicle suspension system of claim 11 wherein the air springs are transversely outboard of the leaf spring assemblies.

13. The vehicle suspension system of claim 12 including a bolster beam extending transversely of and connected to the chassis, the bolster beam having portions extending transversely outboard of the chassis, and means to connect the upper spring seats to the bolster beam.

14. The vehicle suspension system of claims 12 or 13 wherein the lower spring seat comprises plate means extending downwardly from the leaf spring assembly and horizontal spring support means extending outboard from the plate means and being connected to the lower face.

15. The suspension system of claim 11 including a cross radius rod having first and second ends, means for connecting the first end of the cross radius rod to the axle means against one side of the chassis, means to connect the second end of the cross radius rod to the other side of the chassis, and means allowing oscillation of the cross radius rod while preventing transverse movement of the axle means relative to the chassis.

16. The vehicle suspension system of claim 15 wherein the last-named means comprises grommets at the first and second end connections of the cross radius rod.

17. The vehicle suspension system of claim 11 including a sway bar, and means connecting the sway bar between the lower spring seats.

18. The vehicle suspension system of claim 17 wherein the last-named connecting means comprises welding and reinforcing plates.

19. The vehicle suspension system of claim 11 wherein the means to support the upper spring seat from one of the leaf spring assemblies includes a convex plate supported by the upper spring seat and bearing against the upper side of the leaf spring assembly.

* * * * *